Jan. 22, 1929.
R. P. LANSING
1,699,702
VEHICLE SPRING CONTROLLER
Original Filed Dec. 22, 1925
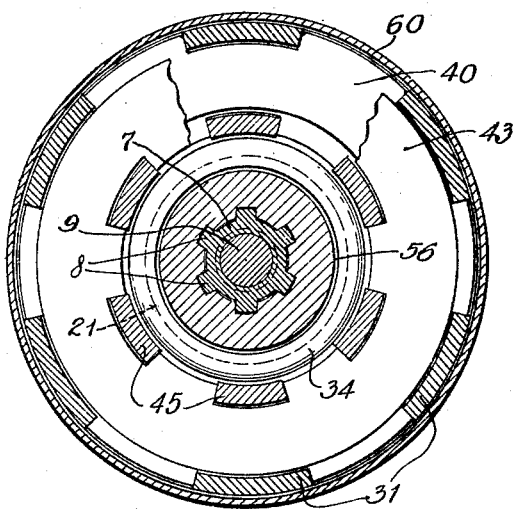
Fig.3,
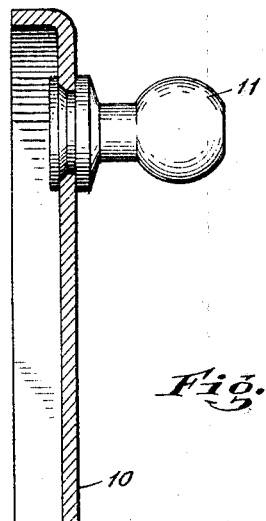
Fig.1,
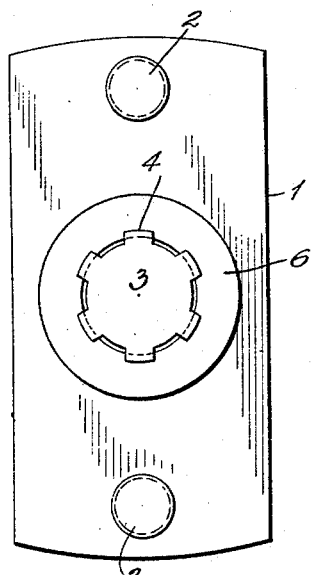
Fig.2,
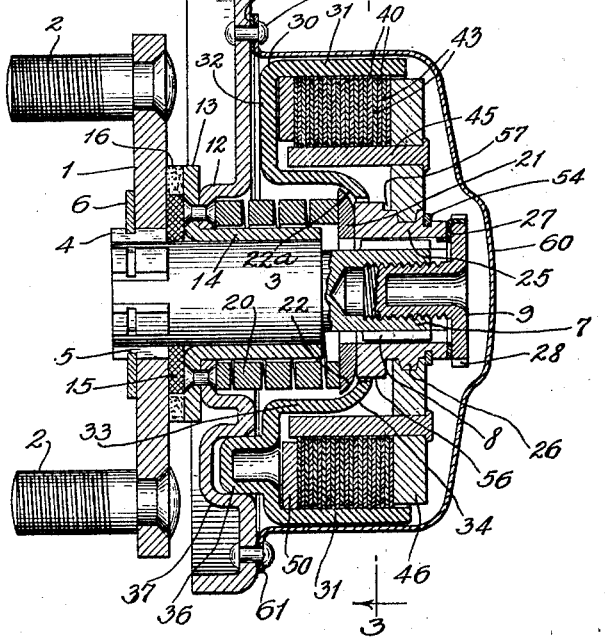
INVENTOR
Raymond P. Lansing,
BY
Dempster M. Smith
ATTORNEY Patented Jan. 22, 1929.

1,699,702

UNITED STATES PATENT OFFICE.

RAYMOND P. LANSING, OF MONTCLAIR, NEW JERSEY.

VEHICLE SPRING CONTROLLER.

Application filed December 22, 1925, Serial No. 77,023. Renewed April 9, 1928.

My invention relates to vehicle spring controllers or "shock absorbers", of the friction type.

The general object is to provide a compact and durable structure of such design that it may be produced at moderate cost, which has an ample total friction surface to produce the desired effects with reasonable spring pressure, and which has certain operative features and advantages sufficiently pointed out in the detail description.

A more particular object is to provide such a structure in which splines or similar formations are not used in the active operation of the device, although they may be employed as irrevoluble or adjustable connections which are practically stationary or inoperative when once adjusted and while the appliance is in service.

Another particular object is to provide for the substantial spacing or separation of the lever arm or similar part of the structure from other parts, such as the friction members or discs, in order to allow for more or less lateral displacement, twisting, etc., of the arm without affecting the friction members or discs, or other operative parts of the structure.

The characteristics and advantages of the invention are further sufficiently explained in connection with the following detail description of the accompanying drawing, which shows one representative embodiment of the invention. After considering this example, skilled persons will understand that many variations may be made, and I contemplate the employment of any structures that are properly within the scope of the appended claims.

Fig. 1 is a horizontal section (with reference to the usual location in a vehicle) of mechanism embodying the invention in one form.

Fig. 2 is an elevation looking toward the inner face of the base plate.

Fig. 3 is a composite vertical, transverse section, with parts broken away in different parallel planes.

A base plate 1 is arranged for connection to a vehicle part, for example, to the vertical web of a side frame member by stud bolts 2 or otherwise. A spindle 3 is arranged or secured at the center of the base plate. The spindle may have splines 4 fitting channels in the base plate to prevent rotation. These splines are annularly slotted as at 5, and a dished washer 6 is applied and pressed flat to engage in the slots 5 and prevent outward displacement of the spindle. The outward portion 7 of the spindle is of reduced diameter and is provided with external splines 8. This portion is also bored and threaded to receive an adjustable abutment screw 9.

A lever or arm 10, which may conveniently be of pressed sheet metal, is provided near its outward end with a ball 11 or other suitable fitting for link connection to a vehicle member to such an axle or an axle fitting. The other or hub end of the lever has an annular dished formation 12 and the bottom of this portion is secured by riveting or otherwise to flange 13 of a thimble 14, which constitutes a bearing sleeve for the arm, rotating upon the main spindle portion 3. Flange 13 has a suitable bearing against the outer face of the base plate. Desirably, a bearing member such as the annular disc 15 is interposed. This may be of a suitable bearing metal, such as bronze, to minimize friction effect at this point, or if moderate friction is desired, it may be of asbestos composition or other suitable friction material. A compressible packing washer 16 is also interposed between flange 13 and the base plate, surrounding the periphery of the bearing disc 15.

A helical pressure spring 20 is located about the bearing thimble 14 and its inward end bears against the bottom of the dished arm formation 12.

A washer 21 is placed on the outward end of the spring and this has a rounded or approximately spherical outward periphery 22 for a purpose referred to below.

A screw member which may in some cases be identified for convenience as an "actuator" 25 is internally splined to co-operate with spindle splines 8, and has multiple screw threads 26 of substantial cross-section and of fairly steep pitch, the pitch angle being variable within substantial limits. The inward end of the screw member or actuator bears against washer 21 and the outward end is opposed to the flanged head of the adjusting screw 9. When the described parts are in place, or after other parts have been positioned, the screw is turned in to initially compress spring 20 to the desired extent, the spring being so held by the screw and the interposed actuator 25 and washer 21. The adjustment may be fixed by a thin sheet metal washer 27 interposed between the screw head or flange and the actuator, and having members engaging the spindle splines 8 and also a flexible member which is bent into engagement with any one of the notches 28 in the periphery of the screw flange.

A member 30, conveniently of pressed sheet metal, which may be identified as a disc, has outwardly projecting members 31, spaced as shown in Fig. 3, and forming practically segments of a cylindrical wall extending from the annular flat bottom 32. This bottom portion also has an inner, outwardly extending cylindrical wall 33 terminating in a substantially spherical formation 34 to co-operate with the spherical peripheral formation 22 of washer 21. The engaging parts of the disc holder and washer provide a rotating bearing for the former and also permit more or less tilting of the disc holder and related parts, or more particularly permit the free and normal seating and location of those parts in the assembly and operation of the appliance without any distortion or binding effects. The bottom 32 of the disc holder has a plurality of inward projecting lugs 36 which may conveniently be formed by pressing operations. These lugs fits with appreciable or substantial clearance in sockets 37 formed in a similar way in the central or hub portion of arm 10. The arrangement just described provides a non-rotative interlock between the arm, the disc holder or cup 30 and related parts, and also permits substantial angular play or twisting of the arm in relation to the other parts, without distortion strains being applied to them and without affecting the operation of the friction mechanism.

A suitable plurality of friction discs 40 are located within the carrier 30 and have peripheral teeth or lugs engaging between the spaced members 31 above mentioned. Other friction discs 43 are interleaved with discs 40 and are provided with internal lugs or projections having non-rotative engagement with spaced cylindrical segments 45 similar to the members 31 and secured in pressure plate 46. For convenience, discs 40 connected to the holder 30 may be called the rotary or driving discs in distinction from the other discs 43 which may be identified as holding discs, since the latter are held stationary when performing the principal frictional retarding function, although they rotate at times along with the other set.

The pressure plate 46 is internally threaded for screw engagement with threads 26 of the actuator and has practically the function of a nut co-operating with the actuator or screw. Its inward surface bears on the outward rotary friction disc 40. A thick spacing washer 50 may be placed next to the bottom portion 32 of the disc carrier to space the inward friction disc away from said bottom, and also from said inward ends of the pins 45.

The pressure plate has limited rotative movement and corresponding axial movement on the screw or actuator 25. This is provided for by a snap ring 54 seated in an annular channel in the actuator to limit outward movement and a flange 56 at the inward end of the actuator, to limit inward movement of the pressure plate, the total motion being represented (with the parts in the position of Fig. 1) by the clearance at 57 between flange 56 and the pressure plate, and an additional moderate clearance preferably provided at $22^a$ between the spherical face of washer 21 and the corresponding internal face of the cup or socket member 34.

The active mechanism, or at least all the outward portion, including the spring, friction discs, etc., are housed and sealed to retain lubricant and exclude dirt and moisture, by a pressed sheet metal cover 60 having an inner flange 61 secured to the arm detachably by screws or otherwise by rivets 62 as shown, with an interposed thin gasket 63 to insure a tight seal. All of the mechanism is thus housed and protected, except for the inner rotative joint between flange 13 and the base plate or bearing ring 15 which is sufficiently sealed by the compressible washer 16.

Desirably, the housing provided by the cover 60 is supplied with a substantial quantity of lubricant, such as a heavy oil or semifluid grease, sufficient to properly lubricate the parts and also to cushion relatively moving parts and substantially or entirely eliminate noticeable noise.

While certain splined connections are used, for example the spindle splines 8 interlocking with internal splines of the actuator 25, these are provided only to permit axial adjustment of the actuator and to prevent its rotation upon the spindle. When once adjusted, the actuator has no movement, being always held directly or indirectly by the spring effect against the screw flange 9, and no difficulties are therefore experienced, such as might be caused, for example, by wear, producing irregularities or shoulders in engaging spline surfaces which have relative sliding movement.

The appliance may be arranged to oppose the greatest frictional resistance either to vertical spring compression or recoil. It is usually considered advisable to apply the greatest resistance to recoil and therefore in the following operative explanation it will be understood that the appliance is so arranged. When the actuator threads 26 have a right hand lead, counter-clockwise movement of arm 10, as viewed in Fig. 2, or from the left in Fig. 1, corresponds to the vehicle spring recoil in which the axle moves from the vehicle frame or body.

When the vehicle wheels strikes a road surface irregularity which causes a vehicle spring compression, arm 10 moves clockwise. Bearing thimble 14 turns on the spindle 3; by the lug connections 36 the disc carrier is rotated along with the arm. All the discs and pressure plate 46 are carried along with the arm and disc holder for a short distance, without any appreciable resistance to the vehicle spring movement because the shock absorber spring 20 is ineffective at this time, its pressure being taken up between the bottom of the cupped arm formation 12, and washer 22, actuator 25 and abutment 9. The only friction effect is that of the flange 13 turning on the bearing ring 15 under the normal pressure of the shock absorber spring 20, but this resistance is usually slight or negligible on account of the bearing action of the ring 15, which usually has a low friction coefficient and also on account of the small average radius of the engaging surfaces. After the arm 10 has moved through a small arc in the stated direction the lead of the screw threads 26 backs off the pressure plate 46 slightly, and the pressure plate then tends to become stationary and all of the discs 40 and 43 may slip with reduced or negligible friction effect. The parts are then in the position of Fig. 1. In case the pressure plate continues to turn along with the disc holder and discs, its rotative movement is checked by stop ring 54, as shown in Fig. 1. At the beginning of vehicle spring recoil movement, arm 10 moves counter-clockwise with no resistance other than the bearing resistance between flange 13 and ring 15, the disc holder 30 moving along with the arm, and all of the discs and pressure plate 46 also rotating by the natural drag of the plates, and this continues until the clearance at 22$^a$ is taken up, providing a substantially free angle or "period" of arm movement in which there is substantially no resistance to vehicle spring recoil. As soon as the clearance at 22$^a$ is taken up, the rotation of the pressure plate along with the disc holder and discs causes the screw thread reaction between the pressure plate and the actuator to move the pressure plate inward. Increased pressure is thus applied to the disc surfaces and this is transferred to the holder 30, its spherical formation 34, washer 21 and the spring, so that additional compression of the spring 20 now commences, while all of the friction members are rotating without slippage or friction effect. The work required to additionally compress the spring, however, provides substantial but relatively moderate resistance to the vehicle spring recoil. This range of movement may conveniently be described as the shock-absorber-spring wind-up range or period. When the vehicle spring recoil movement is somewhat greater than that provided for by the free range or period above mentioned, but is still quite moderate, calling for only moderate checking, the only resistance applied will be that due to the shock absorber spring wind-up action. When the vehicle spring recoil continues beyond the stated range, the inner face of the pressure plate strikes the actuator flange 56 and is thereupon locked against further rotation, with spring 20 additionally compressed to the full extent. The maximum spring pressure is therefore exerted on all the friction surfaces to frictionally resist further axle recoil. This maximum resistance is quickly built up or applied after arm 10 has moved through a relatively small arc and then continues constant through the remaining movement of the arm in the stated direction to effectively check or control the axle recoil movement.

The action of the appliance is independent of axle position due to normal vehicle load, since the shock absorber parts will automatically take a neutral position with respect to any normal axle position and will then act automatically in the described manner to oppose only small or negligible resistance to any range of vehicle spring compression, to oppose small or negligible resistance to any small vehicle spring recoil or to the first small part of any extensive recoil, this being provided for by the free range or period above referred to, with additional but moderate resistance to a further small range of recoil movement, due to the wind-up action of spring 20, and with a greater practically constant resistance, which may be made of any desired value within a reasonable range by adjustment of screw 9, during the remainder of the recoil movement without regard to its amplitude.

The action of the linkage employed to connect arm 10 to a vehicle axle or axle fitting, frequently causes lateral strains which produce more or less lateral deflection or twisting of the arm. Any such abnormal movements of the arm are not communicated to the friction plates or other active parts of the mechanism by reason of the separation of the arm from the disc holder and the flexibility provided by the more-or-less free connections provided by the lugs 36 and sockets 37.

The screw threads connecting the actuator and pressure plate broadly represent any suitable means for producing an axial travel by rotary motion. For instance, these screw threads represent one form of cam. Therefore when reference is made to a screw action or screw threads, these words are not intended to have a necessarily limiting significance.

I claim:

1. An appliance of the class described, comprising a base, yieldable pressure means, an arm revolubly mounted in relation to the base, an actuator connected irrevolubly to the base and holding the yieldable pressure means in initial stress, and friction means arranged for rotation and axial movement and including a carrier, friction plates, and means co-operating with the actuator in one direction of arm rotation to produce axial movement of the friction means with additional stressing of the pressure means, and to restore the pressure means to normal stress in the other direction of rotation.

2. An appliance of the class described, comprising a base, yieldable pressure means, an arm revolubly mounted in relation to the base, an actuator connected irrevolubly to the base and holding the yieldable pressure means in initial stress, and friction means arranged for rotation and axial movement and including a carrier, friction plates, and means co-operating with the actuator in one direction of arm rotation to produce axial movement of said friction means and additional stressing of said yieldable pressure means with subsequent frictional resistance in one direction of rotation, and to substantially reduce the pressure effect and frictional resistance in the other direction of rotation.

3. An appliance of the class described, comprising a base, a spring, an arm revolubly mounted in relation to the base, an actuator connected irrevolubly to the base and holding the spring in initial stress, and friction means arranged for rotation and axial movement and including a carrier, friction plates, and means co-operating with the actuator in one direction of arm rotation to produce axial movement of the friction means with additional stressing of the spring, and to restore the spring to normal stress and relax pressure on said friction mean in the other direction of rotation.

4. An appliance of the class described, comprising a base, a spring, an arm revolubly mounted in relation to the base, an actuator connected irrevolubly to the base and holding the spring in initial stress, and friction means arranged for rotation and axial movement and including a carrier, friction plate, and means co-operating with the actuator in one direction of arm rotation to produce axial movement of said friction means and additional compression of the spring with subsequent frictional resistance, in one direction of rotation, and to substantially eliminate the pressure effect and frictional resistance in the other direction of rotation.

5. An appliance of the class described, comprising a base, an arm mounted for rotation and normally held against substantial axial movement in relation to the base, a spring, an actuator connected irrevolubly to the base and adjustable axially to place the spring under initial compression, the actuator being stationary in normal operation, and a rotary structure comprising friction means and a pressure plate co-operating with the actuator to move said rotary structure axially and produce additional spring compression and frictional resistance in one direction of rotation, and to return the spring to normal compression and substantially eliminate frictional resistance in the other direction of rotation.

6. An appliance of the class described, comprising a base, an arm mounted for rotation and normally held against substantial axial movement in relation to the base, a spring, an actuator connected irrevolubly to the base and adjustable axially to place the spring under initial compression, the actuator being stationary in normal operation, and a rotary structure comprising friction means and a pressure plate co-operating with the actuator to move said rotary structure axially and produce additional spring compression and frictional resistance in one direction of rotation, and to return the spring to normal compression and substantially eliminate frictional resistance in the other direction of rotation, said rotary structure being connected to rotate with and free to move axially in relation to the arm.

7. An appliance of the class described, comprising a base, an arm mounted for rotation and held against axial movement in relation to the base, a pressure spring, an actuator connected irrevolubly to the base and adjustable axially, means for adjusting the actuator to place the spring under initial compression, the actuator being stationary in normal operation, and a rotary structure comprising a disc holder, a plurality of friction discs, and a pressure plate co-operating with the actuator to move said rotary structure axially and produce additional spring compression and frictional resistance in one direction of rotation, and to return the spring to normal compression, and substantially eliminate frictional resistance in the other direction of rotation.

8. An appliance of the class described, comprising a base, an arm mounted for rotation and held against axial movement in relation to the base, a pressure spring, an actuator connected irrevolubly to the base and adjustable axially, means for adjusting the actuator to place the spring under initial compression, the actuator being stationary in normal operation, and a rotary structure comprising a disc holder, a plurality of friction discs, and a pressure plate co-operating with the actuator to move said rotary structure axially and produce additional spring compression and frictional resistance in one direction of rotation, and to return the spring to normal compression, and substantially eliminate frictional resistance in the other direction of rotation, said disc holder being connected to rotate with the arm and free to move axially in relation thereto.

9. An appliance of the class described, comprising a base, a spindle projecting therefrom, an arm having a rotative bearing about the spindle, a spring located about the spindle and bearing against the arm, an actuator having a spline connection with the spindle, means for moving the actuator axially to place the spring under controllable initial compression, the actuator being stationary in normal operation, a disc holder arranged for rotation and axial movement about the spindle and having means co-operating with the spring, a pressure plate, and interleaved friction discs between the pressure plate and disc holder and connected in alternate relation thereto, the pressure plate having screw co-operation with the actuator to produce axial movement of the disc holder, discs and plate with additional spring compression and subsequent frictional slippage of the discs in one direction of rotation, and to return the spring to normal compression and relax the frictional resistance in the other direction of rotation.

10. An appliance of the class described, comprising a base, a spindle projecting therefrom, an arm having a rotative bearing about the spindle, a spring located about the spindle, and bearing against the arm, an actuator having a spline connection with the spindle, means for moving the actuator axially to place the spring under controllable initial compression, the actuator being stationary in normal operation, a disc holder arranged for rotation and axial movement about the spindle and having means co-opeating with spring, a pressure plate, and interleaved friction discs between the pressure plate and disc holder and connected in alternate relation thereto, the pressure plate having screw co-operation with the actuator to produce axial movement of the disc holder, discs and plate with additional spring compression and subsequent frictional slippage of the discs in one direction of rotation, and to return the spring to normal compression and relax the frictional resistance in the other direction of rotation, the disc holder and arm having co-operating means connecting them to rotate together and to permit twisting or other abnormal movements of the arm without effect upon the disc holder and related parts.

11. An appliance of the class described, comprising a base, a spindle projecting therefrom, an arm having a rotative bearing about the spindle, a spring located about the spindle and bearing against the arm, an actuator having a spline connection with the spindle, means for moving the actuator axially to place the spring under controllable initial compression, the actuator being stationary in normal operation, a disc holder arranged for rotation and axial movement about the spindle and having means co-operating with the spring, a pressure plate, and interleaved friction discs between the pressure plate and disc holder and connected in alternate relation thereto, the pressure plate having screw co-operation with the actuator to produce axial movement of the disc holder, discs and plate with additional spring compression and relax the frictional resistance in the other direction of rotation, and a thrust bearing between the base plate and arm.

12. An appliance of the class described, comprising a base, a spindle projecting therefrom, an arm having a rotative bearing about the spindle, a spring located about the spindle and bearing against the arm, an actuator having a spline connection with the spindle, means for moving the actuator axially to place the spring under controllable initial compression, the actuator being stationary in normal operation, a disc holder arranged for rotation and axial movement about the spindle and having means co-operating with the spring, a pressure plate, and interleaved friction discs between the presure plate and disc holder and connected in alternate relation thereto, the pressure plate having screw co-operation with the actuator to produce axial movement of the disc holder, discs and plate with additional spring compression and relax the frictional resistance in the other direction of rotation, the arm being provided with spaced sockets and the disc holder having spaced lugs engaging the sockets with substantial clearance to connect the disc and holder to rotate together and permit relative axial movement of the disc holder and arm.

Signed at Hoboken, in the county of Hudson and State of New Jersey this seventh day of December, A. D. 1925.

RAYMOND P. LANSING.